United States Patent [19]

Jackson

[11] Patent Number: 4,460,115
[45] Date of Patent: Jul. 17, 1984

[54] LOW-MOUNT RACK FOR PANNIERS

[76] Inventor: William S. Jackson, 2860 Tessmer, Ann Arbor, Mich. 48103

[21] Appl. No.: 563,465

[22] Filed: Dec. 20, 1983

[51] Int. Cl.³ .............................................. B62J 9/00
[52] U.S. Cl. ............................... 224/32 R; 224/32 A; 224/39
[58] Field of Search ...................... 224/32 R, 32 A, 39

[56] References Cited

U.S. PATENT DOCUMENTS

| | | | |
|---|---|---|---|
| 4,050,615 | 9/1977 | Kline | 224/39 X |
| 4,353,490 | 10/1982 | Jackson et al. | 224/32 A |
| 4,402,439 | 9/1983 | Brown | 224/32 R |

FOREIGN PATENT DOCUMENTS

| | | | |
|---|---|---|---|
| 618943 | 9/1936 | Fed. Rep. of Germany | 224/39 |
| 997541 | 9/1951 | France | 224/32 R |
| 2502096 | 9/1982 | France | 224/39 |

Primary Examiner—Steven M. Pollard
Attorney, Agent, or Firm—Krass & Young

[57] ABSTRACT

Apparatus is disclosed for carrying panniers on opposite sides of and beneath the top of the wheel of a cycle. A generally U-shaped bar has its opposite ends adapted to be held at a location in the area of the axle. The legs of the bar extend over the top of the wheel and are disposed at an outboard angle forming a generally V-shaped configuration with the fork blades of the cycle. Each pannier is connected to a point on the fork blade by a first fastener and to a point on a leg of the bar by a second fastener. The bar can be easily detached frm the cycle taking with it the panniers by unsecuring the bar ends from the axle and releasing the first fasteners from the fork blades.

14 Claims, 5 Drawing Figures

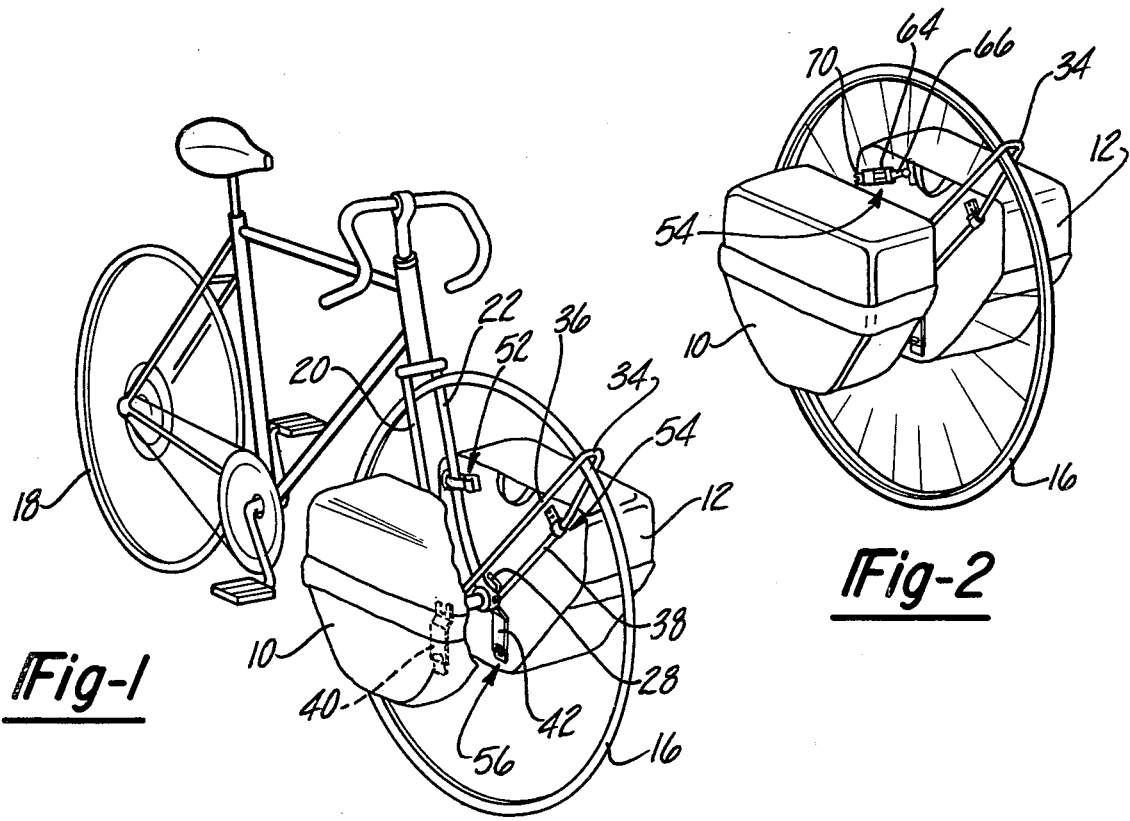
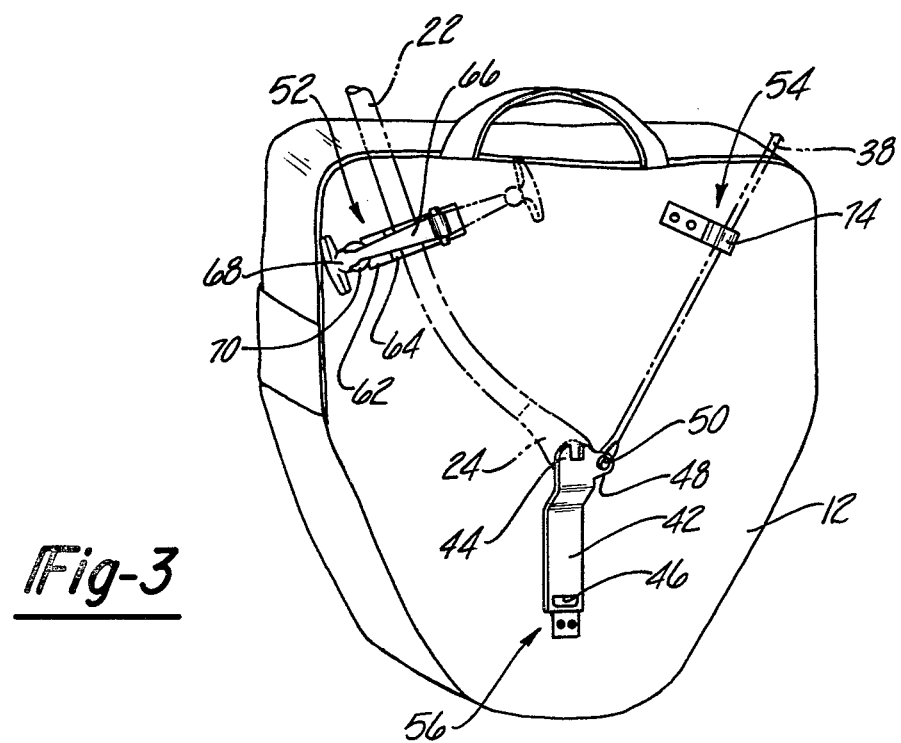

LOW-MOUNT RACK FOR PANNIERS

TECHNICAL FIELD

This invention relates to auxiliary hardware for cycles and, more particularly, to apparatus for mounting panniers to cycles.

BACKGROUND

A pannier is a generic term for a variety of different containers for holding objects and may take the form of open-ended baskets, saddle bags, packs, and the like. It has been customary to mount panniers on a carrier rack secured over the rear wheel of the cycle such as a bicycle or motorcycle. In addition to rear carrier racks, it has been proposed to mount panniers on the lower sides of the front wheel as well. By carrying the panniers in this manner the stability of the cycle is increased and it is possible to obtain more even weight distribution.

Front racks for mounting the panniers in this manner are known. Conventional front racks of this type generally include two outer peripheral frames each including a rigid top cross-piece. Each frame is disposed on one side of the front wheel and they are joined together by a U-shaped bar extending over the wheel. The panniers are removably secured to the frames and thus they can be removed fairly easily. However, it is not so easy to remove the rack from the cycle since the rack is usually "semi-permanently" mounted to the front fork blades of the cycle. The term "semi-permanently" is used because the frames are connected to the blades by hardware that requires the user to employ hand tools or the like to complete the operation. While mounting the rack to the cycle does not take an extraordinary long period of time, there is a sufficient amount of work required that the user is reluctant to remove the rack once installed. Unfortunately, the rack detracts from the asthetics of the cycle and therefore it is quite possible that many cyclists fail to purchase front racks in the first place for this reason.

Illustrative examples of front racks of this type are found in the 1983 New Products Catalog from Eclipse, Inc. of Ann Arbor, Mich. and the 1983 Catalog from Blackburn of Campbell, Calif. It should be understood that other conventional front racks have been used for some time.

SUMMARY OF THE INVENTION

The primary purpose of the peripheral frames of the conventional front racks is to prevent the panniers from interfering with the wheel spokes. Unfortunately, in addition to the mounting problems noted above, the peripheral frames increase the weight of the rack. In contrast, the present invention stems from the realization that most quality panniers include rigid stiffener panels which can perform the same function as the peripheral frame and therefore the frames can be eliminated. In its broadest aspects, however, the present invention has applicability to panniers without the stiffener panels. In addition, the present invention is designed so that the rack can be easily installed or removed from the cycle without requiring the cyclist to use hand tools as required in the past for prior front rack constructions.

Pursuant to the present invention, the peripheral frames have been eliminated and quite simply the apparatus comprises a U-shaped bar having opposite ends thereof adapted to be held at a location in the area of the wheel axle. The bar includes a pair of upwardly extending legs of sufficient length and joined together so that the bar extends over the top of the wheel and is disposed at an outward angle with respect to an imaginary vertical line passing through the axle. Fastening means for each pannier includes a first fastener adapted to be located in the area of a fixed point on the cycle structure inboard of the axle. This first fastener serves to releasably connect an upper rear corner portion of pannier directly to the cycle structure. The cycle structure preferably consists of the fork blades of the cycle. A second fastening means is used to releasably connect an opposite upper rear corner portion of the pannier directly to a point on the leg of the bar. Thus, the bar can be easily detached from the cycle by unsecuring the bar ends from the axle and releasing the first fastener from the cycle structure. Since most quality bicycles include a quick disconnect mechanism for releasing the front wheel, the bar can quickly be mounted and dismounted from the cycle by utilizing the quick release mechanism much in the same manner as removing the front wheel of the cycle. Consequently, the apparatus of the present invention is much easier to install and remove while at the same time it decreases weight and manufacturing expense without sacrificing stability and safe operation for the cyclist.

BRIEF DESCRIPTION OF THE DRAWINGS

These and other advantages will be become apparent to one skilled in the art after reading the following specification and by reference to the drawings in which:

FIG. 1 is a perspective view showing the apparatus of the preferred embodiment mounted to a bicycle;

FIG. 2 is a perspective view illustrating the apparatus and front wheel removed from the bicycle;

FIG. 3 is a perspective view looking towards the rear of one of the panniers showing connections between the pannier, a fork blade of the cycle and the bar;

DESCRIPTION OF THE PREFERRED EMBODIMENT

Figure 4:
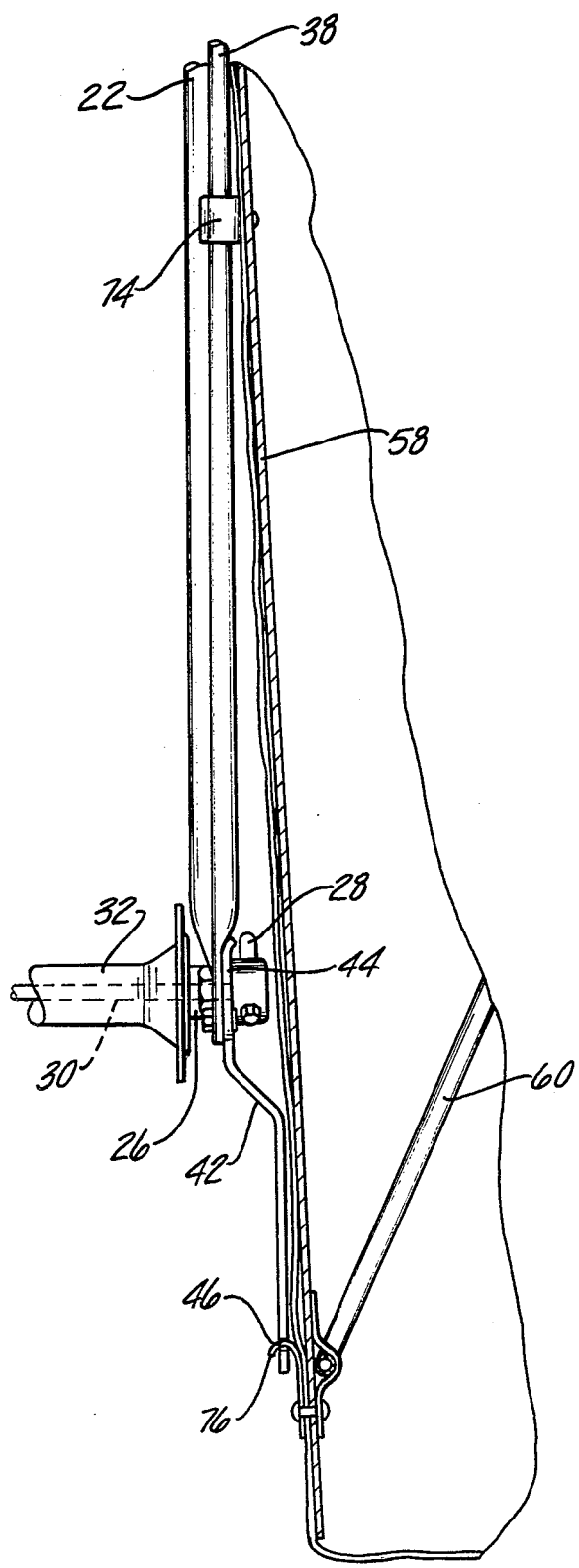
FIG. 4 is a fragmentary view with parts in cross-section of the apparatus as connected to the axle as viewed from the front of the bicycle looking towards the rear thereof.

Referring now to the drawings, a pair of panniers 10,12 are shown mounted to a cycle 14 using the apparatus of the preferred embodiment of the invention. In FIG. 1, the panniers 10,12 are shown as being carried on opposite sides of and beneath the top of the front wheel 16. However, it should be understood that the panniers could be mounted according to the teachings of this invention adjacent the rear wheel 18, if desired. Bicycle 14 provides some fixed structure which is inboard of the wheel axle. Preferably, this fixed structure is provided via the fork blades such as the front fork blades 20 and 22. As shown most clearly in FIGS. 4 and 5, the fork blades each include a fork end or dropout 24 which slip over the axle 26. Each wheel is rotatably mounted about its respective axle. In many quality bicycles, there is included a quick release mechanism that enables the cyclist to quickly remove the front wheel 16 from the fork blades 20,22. This quick release mechanism includes a handle 28 connected at one end to a skewer 30 which passes through axle 26 and the wheel hub 32. The opposite end of the skewer 30 is connected to a cap 33 on the opposite side of hub 32 (see FIG. 5). By rotating handle 28, the clamping force is released to allow the wheel to be removed. Quick release mechanisms of this type are well known in the art. Therefore, further details thereof are not necessary to the understanding of this invention.

The present invention advantageously employs a U-shaped bar 34 having upwardly extending legs 36,38. Legs 36 and 38 are of sufficient length and joined together so that they extend over the wheel 16 as can be seen most clearly in FIG. 1. The opposite ends of the bar 34 are adapted to be secured in the area of axle 26. According to the preferred embodiment, this is accomplished by way of a pair of brackets 40,42. Each bracket has a forked upper end 44 which is adapted to engage the underside of axle 26. Each bracket is in the form of an elongated metal strip having a stepped configuration such that the lower portion thereof is displaced outwardly from the forked upper end 44. This can be seen most clearly in FIG. 4. The lower portion of the bracket includes a horizontally extending slot 46 therein whose purpose will be described later herein. The upper end of the bracket adjacent the forked end 44 includes an ear portion 48. Means are provided for connecting the opposite ends of the bar 34 to the ear portion 48 of the bracket. In this example, this is accomplished by way of a nut and bolt fastener 50.

Each pannier is connected by way of at least two fastening means, each located on opposite upper rear corner portions of the pannier. The first fastening means 52 is adapted to releasably connect the pannier to a fixed point on the cycle, here, the cycle fork blade. The second fastening means, 54 is adapted to releasably connect the pannier to a point on the leg of bar 34. Bar 34 is disposed at an outboard angle with respect to an imaginary vertical line passing through axle 26. Bar 34 cooperates with the fork blades to form a generally V-shaped configuration as shown most clearly in FIGS. 1 and 3. With the fasteners 52 and 54 respectively connecting the pannier in this manner to the blade and bar 34 the weight of the pannier causes the rear portion thereof between the fasteners to be in tension. Consequently, the angular orientation of the bar 34 remains fixed even though it is connected to the cycle only at one point at the axle. Increased stability is obtained by providing a third fastening means 56 located beneath the axle which releasably secures lower portions of the pannier to the mounting structure.

Figure 5:
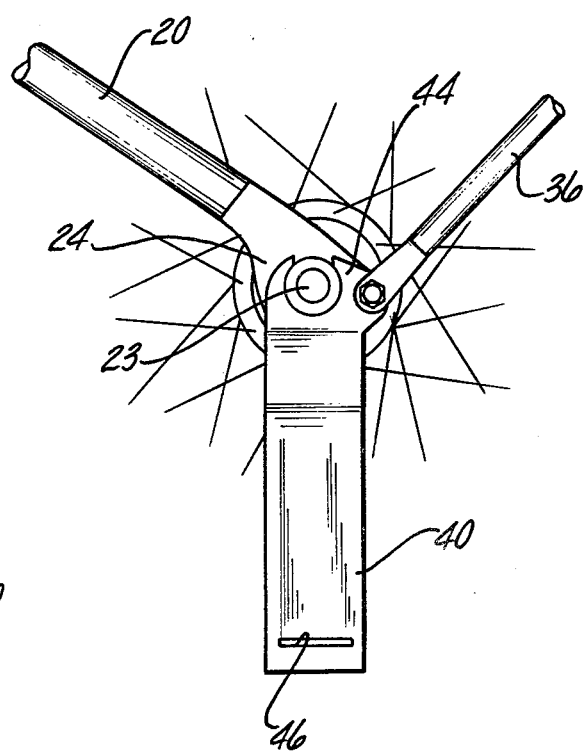
FIG. 5 is a fragmentary side view of the apparatus connected to the opposite side of an axle with the pannier removed.

Most quality panniers include a rigid stiffener panel 58 as shown in FIG. 4. The pannier may also include a pivoting U-shaped bar 60 to hold the flexible pannier outer skin in an extended condition. The stiffener panel 58 is located on the interior rear portion of the bag. Preferably, the fastening means 52,54,56 are connected to the stiffener panel 58. In such instances, the fastening means 52,54,56 always remain in a fixed location relative to the pannier. Consequently, the orientation of the bar 34 is rigidly held in place and it is not necessary to rely on the weight of the bag to provide this function.

In the preferred embodiment, fastening means 52 includes a device having an elongated base 62 connected to the stiffener panel 58. The outer surface of the device is in the form of a cradle 64 which corresponds to the shape of the fork blade which rests therein. Cradle 64 is preferably made of a material which will not scratch the fork blades. A resilient strap 66 is connected at one end to base 62 on one side of cradle 64. The other end of strap 66 includes an enlarged head 68. The pannier is secured to the fork blade by stretching the strap around the blade and securing the neck portion of the strap in a forked receptacle 70.

In the preferred embodiment, fastening means 54 comprises a hook 74 defining an inner cavity for receiving the leg of bar 34. Hook 74 is oriented so that the axis of the defined cavity generally parallels that of the bar leg. Fastening means 56 comprises a downwardly curled hook 76 which is adapted to fit within the bracket slot 46. Fasteners 52,54, and 56 are rigidly connected to the stiffener panel by way of screws, rivets or the like.

As shown in FIG. 2, the pannier mounting structure can be easily removed from the cycle 14. All that need be done is that the user disconnect fastener 52 from the cycle and then use the quick release mechanism to unclamp the forked end of the brackets from the axle construction. This permits the user to remove the bar 34 and associated structure taking with it the panniers 10 and 12. Quite often, the cyclist also would want to remove the front wheel 16. The construction of the present invention allows the cyclist to remove the front wheel and all of the pannier mounting apparatus in one quick and easy operation as illustrated in the drawing. No special tools are needed to install or remove the pannier carrying apparatus and therefore the problems noted above with respect to semi-permanently mounted conventional front racks are eliminated. The present invention contains no peripheral frames that were used in the past and therefore the weight of the structure is reduced while also reducing manufacturing costs. All these advantages are achieved while at the same time providing the cyclist with safe and stable operation especially where panniers having the rear stiffener panels are employed, the later insuring that the flexible outer skin material of the pannier does not interfere with the spokes of the wheel.

While this invention has been described in connection with a specific example thereof, various modifications will become apparent to those skilled in the art after a study of the specification drawings and claims.

I claim:

1. Apparatus for carrying panniers on opposite sides of and beneath the top of a wheel of a cycle mounted for rotation about an axle, said cycle having structure with at least one fixed point disposed above and inboard of the axle, said apparatus comprising:

a generally U-shaped bar having opposite ends thereof adapted to be held at a location in the area of the axle, said bar further including a pair of legs of sufficient length and joined together so that the bar extends over the top of the wheel and is disposed at an outboard angle with respect to an imaginery vertical line passing through the axle;

fastening means for each pannier including a first fastening means adapted to be located in the area of the fixed point on the cycle structure and serving to be releasably connect an upper rear corner portion of the pannier directly to the cycle structure, and second fastening means for releasably connecting an opposite upper rear corner portion of the pannier directly to a point on a leg of the bar;

whereby said bar can be easily detached from the cycle by unsecuring the bar ends from the axle and releasing the first fastener from the cycle structure.

2. The apparatus of claim 1 wherein said cycle structure comprises a front fork blade of the cycle.

3. The apparatus of claim 2 wherein said first fastening means includes:
a device connected to the pannier and having a cradle formed in an outer surface thereof for receiving the cycle blade, and a strap adapted to extend around the blade and secure the pannier thereto.

4. The apparatus of claim 3 wherein said strap is resilient and is attached at one end to the device on one side of the cradle, with the other end of the strap releasably engaging means on the device on the other side of the cradle.

5. The apparatus of claim 3 wherein said second fastener comprises a hook connected to the pannier for engaging the leg of the bar.

6. The apparatus of claim 1 wherein said fastening means includes a third fastening means adapted to be located beneath the axle for releasably connecting lower rear portions of the pannier to a member depending from the legs of the bar.

7. The apparatus of claim 6 wherein said member comprises a bracket having a forked upper end for engaging the axle, means for attaching one bar end to the bracket, and means cooperating with the third fastening means for releasably connecting the pannier to the bracket.

8. The apparatus of claim 7 wherein said bracket is an elongated strip whose lower portion includes a slot therein cooperating with a downwardly curled hook fixed to the pannier forming the third fastening means.

9. Apparatus for carrying panniers on opposite sides of and beneath the top of a wheel of a cycle mounted for rotation about an axle, said cycle having front fork blades extending downwardly and connected to the axle, said apparatus comprising:
first and second brackets each in the form of an elongated strip, upper portions of each bracket having a forked end for engaging opposite sides of the axle;
a generally U-shaped bar having opposite ends thereof connected to the brackets, said bar having a pair of upwardly extending legs of sufficient length and joined together so that the bar extends over the top of the wheel and is disposed at an outboard angle so that the bar cooperates with the fork blades to form a generally V-shaped configuration;
fastening means for each pannier including first fastening means adapted to be connected to an upper rear corner portion of the pannier for releasably securing same to a fork blade, and second fastening means adapted to be connected to an opposite upper rear corner portion of the pannier for releasably connecting same to a point on a leg of the bar;
whereby said apparatus can be easily detached from the cycle by unsecuring the brackets from the axle and releasing the first fastening means from the cycle blades.

10. The apparatus of claim 9 wherein each bracket includes a generally horizontally disposed slot therein and wherein said fastening means further includes a reversely curled hook adapted to be connected to lower portions of the pannier for engaging said slot.

11. The apparatus of claim 10 wherein each bracket includes an ear portion adjacent the forked end thereof to which the ends of the bar are attached.

12. The apparatus of claim 11 wherein each bracket has a stepped configuration with the slot being formed in a segment of the bracket displaced outwardly from the forked end portion of the bracket.

13. Apparatus comprising:
a pannier having a rigid stiffener panel located in the interior rear portion of the pannier, first fastening means disposed in an upper rear exterior corner of the pannier fixed to the stiffener panel, second fastening means located in an opposite upper rear exterior corner portion of the pannier and fixed to the stiffener panel, and third fastening means located on lower portions of the pannier fixed to the stiffener panel; and
apparatus for carrying two of said panniers on opposite sides of and beneath the top of a wheel of a cycle mounted for rotation about an axle, said cycle having front fork blades whose ends are releasably secured to the axle, said apparatus comprising:
a pair of brackets each in the form of an elongated strip, upper ends of end bracket having a forked portion for engaging opposite sides of said axle and having a lower portion including a slot therein; a generally U-shaped bar having opposite ends thereof fixed to the brackets, said bar having a pair of upwardly extending legs of sufficient length and joined together so that the bar extends over the top of the wheel and cooperates with the front fork blades to define a generally V-shaped configuration;
said first fastening means being releasably connected to a front blade of the cycle, said second fastening means being releasably connected to a leg of the bar and said third fastening means being releasably connected to the slot in the bracket.

14. A method of carrying panniers on opposite sides of and beneath the top of a wheel of a cycle mounted for rotation about an axle, said cycle including a pair of front fork blades whose ends are detachably connected to the axle, said cycle further including a quick release mechanism for releasably securing parts to the axle, said method comprising:
using the quick release mechanism to secure opposite ends of a U-shaped bar at a location in the area of the axle, said U-shaped bar including a pair of upwardly extending legs of sufficient length and joined together so that the bar extends over the top of the wheel;
disposing the bar at an outboard angle so that it cooperates with the front blades to form a generally V-shaped configuration;
releasably securing an upper rear corner portion of a pannier to a point on a fork blade of the cycle;
securing an opposite upper rear corner portion of the pannier to a point on the leg of the bar; and
using said quick release mechanism to unsecure the bar from the axle, and releasing the first fastener from the cycle blade so that the bar can be removed.

* * * * *